US010095637B2

(12) United States Patent
Smaus et al.

(10) Patent No.: US 10,095,637 B2
(45) Date of Patent: Oct. 9, 2018

(54) SPECULATIVE RETIREMENT OF POST-LOCK INSTRUCTIONS

(71) Applicant: Advanced Micro Devices, Inc., Sunnyvale, CA (US)

(72) Inventors: Gregory W. Smaus, Austin, TX (US); John M. King, Austin, TX (US); Michael D. Achenbach, Austin, TX (US); Kevin M. Lepak, Austin, TX (US); Matthew A. Rafacz, Austin, TX (US); Noah Bamford, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 100 days.

(21) Appl. No.: 15/267,094

(22) Filed: Sep. 15, 2016

(65) Prior Publication Data

US 2018/0074977 A1    Mar. 15, 2018

(51) Int. Cl.
*G06F 12/00*    (2006.01)
*G06F 13/00*    (2006.01)
(Continued)

(52) U.S. Cl.
CPC ...... *G06F 12/1466* (2013.01); *G06F 9/30043* (2013.01); *G06F 9/528* (2013.01); *G06F 2212/1052* (2013.01)

(58) Field of Classification Search
CPC ............ G06F 3/00; G06F 3/06–3/0689; G06F 9/30–9/30043; G06F 9/30047–9/30087;
(Continued)

(56) References Cited

U.S. PATENT DOCUMENTS 5,632,023 A * 5/1997 White ................. G06F 9/30094
712/215
5,634,023 A * 5/1997 Adler ................. G06F 9/30072
712/23
(Continued)

OTHER PUBLICATIONS

ASF: AMD64 Extension for Lock-Free Data Structures and Transactional Memory; Chung et al.; 43rd Annual IEEE/ACM International Symposium on Microarchitecture; Dec. 4-8, 2010; pp. 39-50 (Year: 2010).*

(Continued)

*Primary Examiner* — Daniel C Chappell
(74) *Attorney, Agent, or Firm* — Volpe and Koenig, P.C.

(57) ABSTRACT

Techniques for improving execution of a lock instruction are provided herein. A lock instruction and younger instructions are allowed to speculatively retire prior to the store portion of the lock instruction committing its value to memory. These instructions thus do not have to wait for the lock instruction to complete before retiring. In the event that the processor detects a violation of the atomic or fencing properties of the lock instruction prior to committing the value of the lock instruction, the processor rolls back state and executes the lock instruction in a slow mode in which younger instructions are not allowed to retire until the stored value of the lock instruction is committed. Speculative retirement of these instructions results in increased processing speed, as instructions no longer need to wait to retire after execution of a lock instruction.

17 Claims, 6 Drawing Sheets

(51) Int. Cl.
*G06F 13/28* (2006.01)
*G06F 12/14* (2006.01)
*G06F 9/52* (2006.01)
*G06F 9/30* (2018.01)

(58) Field of Classification Search
CPC . G06F 9/3009–9/46; G06F 9/461–9/52; G06F 9/522–9/528; G06F 9/54–9/548; G06F 12/00; G06F 12/14–12/1466; G06F 12/1475–12/1491; G06F 21/00–21/88; G06F 2201/00–2201/885; G06F 2209/00–2209/549; G06F 2211/00–2211/902; G06F 2212/00–2212/7211; G06F 2213/00–2213/4004; G06F 2221/00–2221/2153
See application file for complete search history.

(56) References Cited

U.S. PATENT DOCUMENTS

| | | | | |
|---|---|---|---|---|
| 5,636,374 | A * | 6/1997 | Rodgers | G06F 9/30043 712/208 |
| 5,649,225 | A * | 7/1997 | White | G06F 9/30032 712/1 |
| 5,724,536 | A * | 3/1998 | Abramson | G06F 9/30043 712/216 |
| 5,765,016 | A * | 6/1998 | Walker | G06F 9/3836 712/217 |
| 5,796,973 | A * | 8/1998 | Witt | G06F 9/30149 712/204 |
| 5,796,974 | A * | 8/1998 | Goddard | G06F 8/66 712/209 |
| 6,370,625 | B1 * | 4/2002 | Carmean | G06F 9/3004 711/150 |
| 6,553,480 | B1 * | 4/2003 | Cheong | G06F 9/3836 712/23 |
| 6,651,151 | B2 * | 11/2003 | Palanca | G06F 9/30047 711/158 |
| 6,708,269 | B1 * | 3/2004 | Tiruvallur | G06F 9/3004 711/141 |
| 6,978,360 | B2 * | 12/2005 | Bilardi | G06F 9/30043 712/219 |
| 9,535,744 | B2 * | 1/2017 | Rajwar | G06F 9/467 |
| 9,690,709 | B2 * | 6/2017 | Sandoz | G06F 3/0622 |
| 9,880,848 | B2 * | 1/2018 | Chung | G06F 9/3842 |
| 9,940,138 | B2 * | 4/2018 | Lopez | G06F 9/3863 |
| 9,946,543 | B2 * | 4/2018 | Chou | G06F 9/3012 |
| 2002/0087810 | A1 * | 7/2002 | Boatright | G06F 12/0831 711/145 |
| 2002/0087849 | A1 * | 7/2002 | Arimilli | G06F 9/30087 712/235 |
| 2003/0079094 | A1 * | 4/2003 | Rajwar | G06F 9/3004 711/150 |
| 2004/0123078 | A1 * | 6/2004 | Hum | G06F 9/3004 712/217 |
| 2005/0154866 | A1 * | 7/2005 | Steely, Jr. | G06F 9/383 712/228 |
| 2006/0004998 | A1 * | 1/2006 | Saha | G06F 9/3004 712/245 |
| 2006/0149931 | A1 * | 7/2006 | Haitham | G06F 9/3824 712/218 |
| 2006/0161740 | A1 * | 7/2006 | Kottapalli | G06F 9/528 711/152 |
| 2008/0065864 | A1 * | 3/2008 | Akkary | G06F 9/3834 712/225 |
| 2008/0126883 | A1 * | 5/2008 | Caprioli | G06F 9/3004 714/49 |
| 2008/0141002 | A1 * | 6/2008 | Bhargava | G06F 9/3867 712/220 |
| 2009/0164758 | A1 * | 6/2009 | Haertel | G06F 9/3004 712/215 |
| 2010/0269102 | A1 * | 10/2010 | Latorre | G06F 9/3842 717/130 |
| 2012/0144126 | A1 * | 6/2012 | Nimmala | G06F 12/084 711/141 |
| 2014/0013060 | A1 * | 1/2014 | Frey | G06F 12/0813 711/146 |
| 2014/0040551 | A1 * | 2/2014 | Blainey | G06F 12/0833 711/122 |
| 2014/0040557 | A1 * | 2/2014 | Frey | G06F 12/084 711/130 |
| 2014/0047205 | A1 * | 2/2014 | Frey | G06F 3/0668 711/163 |
| 2014/0244978 | A1 * | 8/2014 | King | G06F 9/384 712/217 |
| 2015/0006496 | A1 * | 1/2015 | Rajwar | G06F 9/467 707/703 |
| 2015/0052313 | A1 * | 2/2015 | Ghai | G06F 9/467 711/136 |
| 2015/0052315 | A1 * | 2/2015 | Ghai | G06F 9/467 711/145 |
| 2015/0242251 | A1 * | 8/2015 | Guthrie | G06F 9/5033 711/137 |
| 2015/0378778 | A1 | 12/2015 | Gschwind et al. | |
| 2016/0092236 | A1 * | 3/2016 | Kanapathipaillai | G06F 9/3842 712/216 |
| 2016/0179569 | A1 * | 6/2016 | Gottschlich | G06F 9/467 711/147 |
| 2016/0378502 | A1 * | 12/2016 | Burger | G06F 9/3802 712/214 |
| 2017/0004085 | A1 * | 1/2017 | Guthrie | G06F 12/0857 |
| 2017/0031827 | A1 * | 2/2017 | McCormick, Jr. | G06F 12/0875 |
| 2017/0177365 | A1 * | 6/2017 | Doshi | G06F 9/30043 |
| 2017/0235638 | A1 * | 8/2017 | Knauth | G06F 11/1407 710/313 |

OTHER PUBLICATIONS

Using speculative retirement and larger instruction windows to narrow the performance gap between memory consistency models; Ranganathan et al.; Proceedings of the ninth annual ACM symposium on Parallel algorithms and architectures; Jun. 23-25, 1997; pp. 199-210 (Year: 1997).*

InvisiFence: performance-transparent memory ordering in conventional multiprocessors; Blundell et al.; Proceedings of the 36th annual international symposium on Computer architecture; Jun. 20-24, 2009; pp. 233-244 (Year: 2009).*

WeeFence: toward making fences free in TSO; Duan et al.; Proceedings of the 40th Annual International Symposium on Computer Architecture; Jun. 23-27, 2013; pp. 213-224 (Year: 2013).*

* cited by examiner

US 10,095,637 B2

SPECULATIVE RETIREMENT OF POST-LOCK INSTRUCTIONS

BACKGROUND

A lock instruction is a type of instruction that reads data from memory, modifies that data, and stores that data back to memory. A lock instruction has an atomic property and a fencing property. The atomic property prevents modifications to the memory address associated with the load instruction from occurring between the time that the lock instruction begins and the time the lock instruction ends. The fencing property says that all memory accesses "older" (before, in program order) than the lock instruction must complete before memory accesses after the lock instruction are allowed to complete. Strict application of these properties can result in processor slowdowns due to delays associated with requiring the lock instruction and younger instructions to wait for older instructions to complete.

BRIEF DESCRIPTION OF THE DRAWINGS

A more detailed understanding may be had from the following description, given by way of example in conjunction with the accompanying drawings wherein.

DETAILED DESCRIPTION

A lock instruction and younger instructions are allowed to speculatively retire prior to the store portion of the lock instruction committing its value to memory. These instructions thus do not have to wait for the lock instruction to complete before retiring. In the event that the processor detects a violation of the atomic or fencing properties of the lock instruction prior to committing the value of the lock instruction, the processor rolls back state and executes the lock instruction in a slow mode in which younger instructions are not allowed to execute until the stored value of the lock instruction is committed. Speculative retirement of these instructions results in increased processing speed, as instructions no longer need to wait to retire until after the stored value of the lock instruction is committed.

Figure 1:
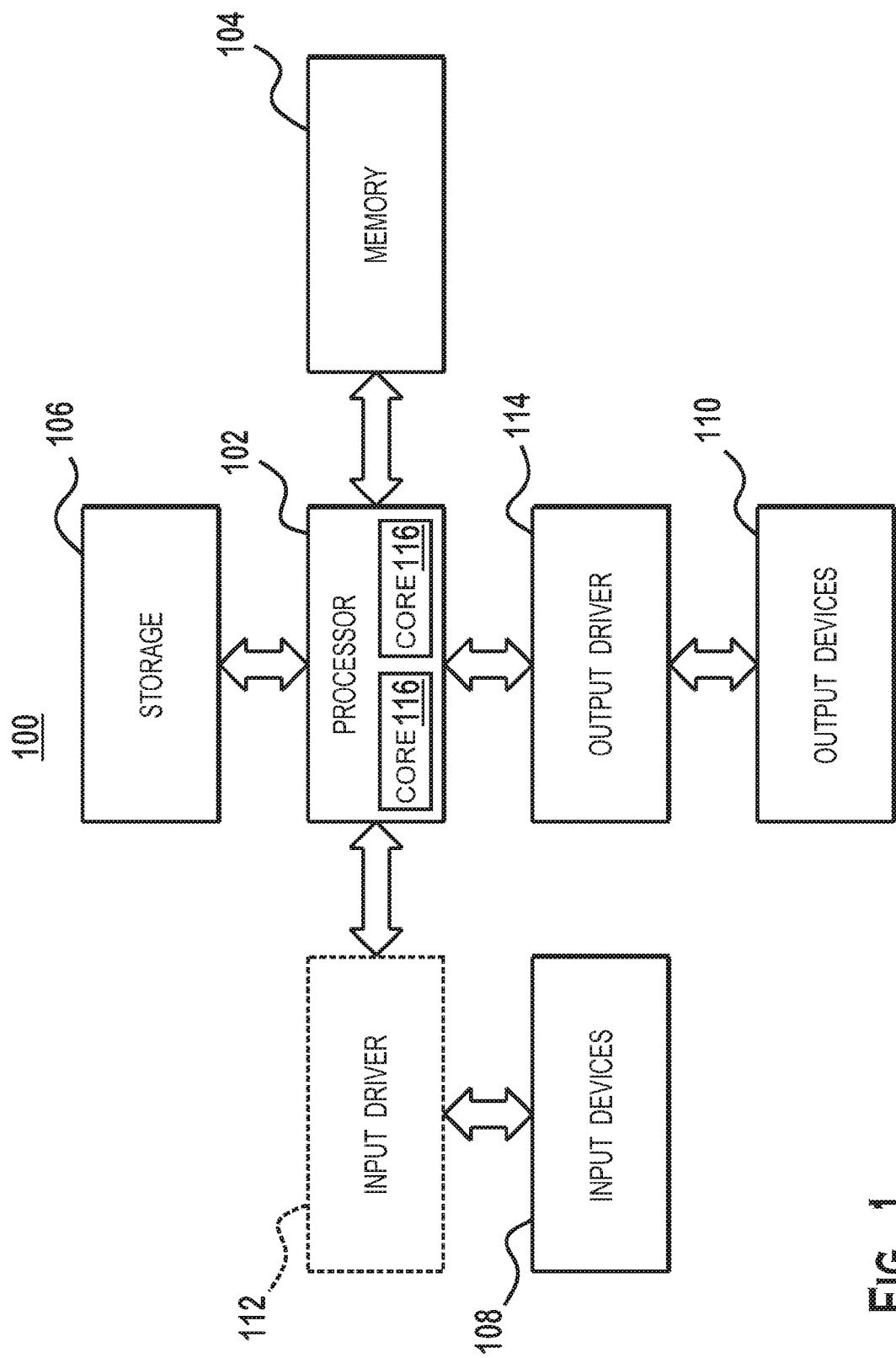
FIG. 1 is a block diagram of an example device in which one or more disclosed features may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes multiple cores 116. In one example, each core 116 is a central processing unit (CPU). In other examples, each core 116 is one of a central processing unit (CPU) or a graphics processing unit (GPU). The multiple cores 116 execute independent workloads that have the ability to coordinate through memory mechanisms and through coherence mechanisms. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
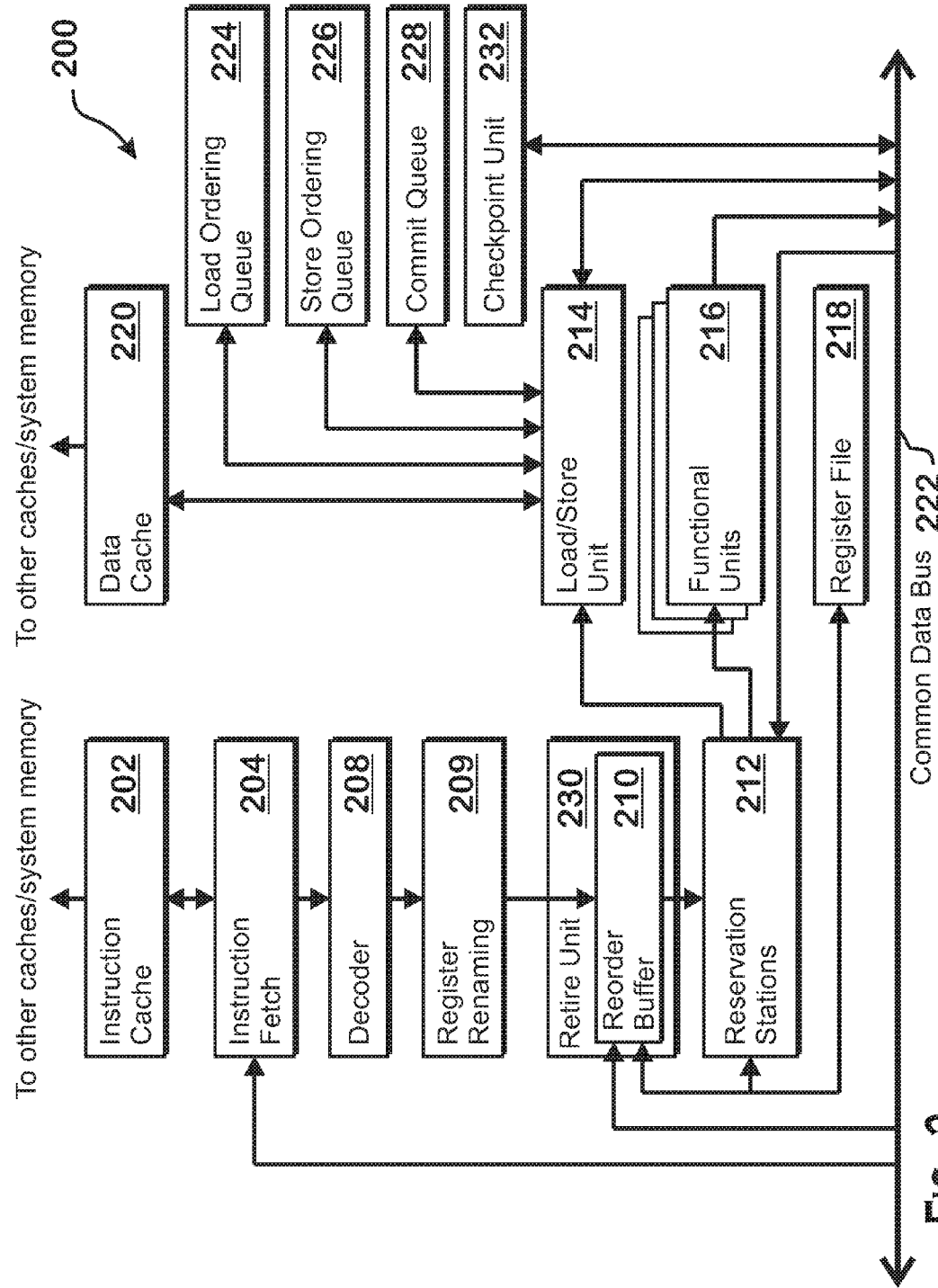
FIG. 2 is a block diagram of an instruction execution pipeline, included within a core of the processor of FIG. 1, according to an example.

FIG. 2 is a block diagram of an instruction execution pipeline 200, included within a core 116 of the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load/store unit 214 configured to load data from or store data to system memory via a data cache 220, and a register file 218 which includes registers that store working data for the instructions.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). Reservation stations 212 maintain in-flight instructions and track instruction operands. When all operands are ready for execution of a particular instruction, reservation stations 212 send the instruction to a functional unit 216 or a load/store unit 214 for execution. When execution is complete, the instruction is said to be "completed" or to "have completed." Thus, an instruction that has "completed" means that execution of the instruction has finished. Saying that an instruction "executed" or "has executed" is synonymous with saying that an instruction is "completed" or "has completed." The retire unit 230 retires instructions ready for retirement, which happens after the instruction has completed.

The register renaming unit 209 renames the architectural registers specified by the instructions to physical registers present in the register file 218 in accordance with well-known register renaming techniques while the instructions are in-flight. As is generally known, register renaming de-serializes instructions that could be performed in parallel, thereby speeding up processor execution. Renamed registers are used for instructions that are in-flight, whereas non-renamed "architectural" registers are deemed to store the "true" value for a particular architectural register. Architectural registers are written upon retirement of instructions. Note that in this description, whenever the concept of "writing to architectural registers" is discussed, this concept can be substituted with the concept of simply assigning one of the physical registers to a particular architectural register (thus actually copying the contents of one register to another is not required).

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

The load/store unit 214 is coupled to a load ordering queue 224, a store ordering queue 226, and a commit queue 228. These queues are present to ensure that load instructions and store instructions appear to software to execute in order while also providing the processor 102 the freedom and associated processing speedups with actually executing these instructions out of order.

More specifically, when a load or store instruction arrives at the load/store unit 214 and is otherwise ready to execute, the load/store unit 214 executes such instruction, regardless of program order. This execution occurs even though the potentially out-of-order execution means that a particular loaded value can become stale between the time that the load instruction is executed and the time that the load instruction is ready to retire due to being the oldest instruction in the reorder buffer 210.

More specifically, upon execution, the loaded value is retrieved and sits in a renamed register within register file 218 until the load instruction retires. Once the load instruction retires, the loaded value becomes the "canonical" value, sitting in a register deemed to be the architectural register.

To execute the load instruction, the load/store unit 214 retrieves a particular value from memory unless the store ordering queue 226 includes an indication of an older store instruction that stores to the same memory address as the load instruction. In that instance, the load instruction retrieves the value to be stored by such store instruction from the register indicated as the source for that store instruction (i.e., the renamed register holding the data to be stored).

Store instructions to the same address as the load instruction that are older than the load instruction but that nevertheless execute after the load instruction update the value of the load instruction. More specifically, upon execution of a store instruction, the processor 102 checks the load ordering queue 224 to find younger load instructions that load from the same memory address as the store instruction. The processor 102 flushes the load instruction and also flushes all instructions younger than the load instruction, causing those instructions to re-execute. Any instructions dependent on the now-updated load instruction re-execute based on the updated value. Because of the new value from the store instruction, the re-executed load instruction "sees" the correct value from that store instruction.

A load instruction is considered to be pending (not yet retired) until the loaded value is written to an architectural register. Thus, load instructions are pending until retirement. Store instructions, on the other hand, are considered pending past the point at which the store instructions retire. More specifically, store instructions are issued, executed by the load/store unit 214, and retire when the load/store unit 214 issues the stored value to memory to be written. However, the value to be stored is not yet written to memory at that point due to memory access latency. The act of actually writing the value to memory is called "committing" the store instruction.

To ensure committing of store values in program order, the load/store unit 214 maintains the store instructions in a commit queue 228 in program order. Values at the head of the queue are considered to be the oldest stores ready to be committed and are committed to memory at that point. Values cannot be committed to memory if the values are not at the head of the commit queue 228. When a value for a store instruction is written to memory (typically to a cache such as data cache 220), the store instruction is removed from the commit queue 228. At this point, the store instruction is considered to be no longer pending.

Lock instructions are instructions that include a load component, an "op" (operation) component, and a store component. More specifically, a lock instruction reads data from a memory address, modifies that data according to a specified operation, and writes the modified data back to the memory address. Lock instructions have both an atomic property and a fencing property. The atomic property means that in between the time the lock instruction reads the data and the time instruction writes the data, no stores can be made to the memory address specified by the lock instruction. The fencing property means that the lock instruction waits for all older loads to complete and stores to commit within the same thread as the lock instruction before executing and all loads and stores younger than the lock instruction within the same thread as the lock instruction wait for the lock instruction to complete before execution.

Strict application of the above two properties leads to significant slowdowns in processor execution related to the need to stall instructions that are either dependent on or younger than the lock instruction. To improve execution speed, the processor 102 relaxes the above properties while still making it appear to software as if the above properties are maintained. More specifically, the processor 102 allows retirement of the lock instruction and of instructions younger than the lock instruction to occur instead of preventing retirement of such instructions until the store operation of the lock instruction commits. The processor 102 treats the load, operation, and store portions of the lock instruction as regular, non-atomic, non-fencing operations, except that the processor 102 checks to determine whether certain operations that occur violate the atomic or fencing properties of the lock instruction. In other words, instead of "upholding" the atomic and fencing properties of the lock instruction by stalling the lock instruction and instructions dependent on the lock instruction, the processor 102 instead allows such instructions to execute and retire speculatively. The atomic and fencing properties of the lock instruction are "upheld" by detecting a violation to such properties and, in the event of such a violation, rewinding the state of the processor 102 to an earlier point in time, and resuming execution in a "safe" mode (or "slow" mode) in which the above properties are more strictly upheld.

The processor 102 detects a violation of either property by detecting, from a thread other than the thread executing the lock instruction, a request to allow a store to occur to either the memory address specified by the lock instruction (violation of the atomic property) or to the memory address specified by a completed load instruction from the same thread as the lock instruction that is younger than the lock instruction (violation of the fencing property). One example of such a request is an invalidating probe. An invalidating probe is a signal from a first core 116 to a second core 116 that acts as a request for "ownership" of a particular cache line. Ownership allows a core 116 to store to a particular cache line. An invalidating probe is sent to the load ordering queue 224, and thus loads are retained in the load ordering queue 224 while the lock instruction is pending (that is, loads are retained in the load ordering queue 224 until the store of the lock instruction commits). Another example is a notification by a first thread in a core 116 to a second thread in that core 116 that the first thread wants to store to a particular memory location.

Stores from the same thread as the thread in which the lock instruction is executing do not violate the atomic or fencing properties because the atomic and fencing properties are concerned with inter-thread memory operations. Out-of-order execution of loads and stores within a particular thread are handled by normal mechanisms for handling data hazards and are unrelated to the atomic and fencing properties.

Figure 3A:
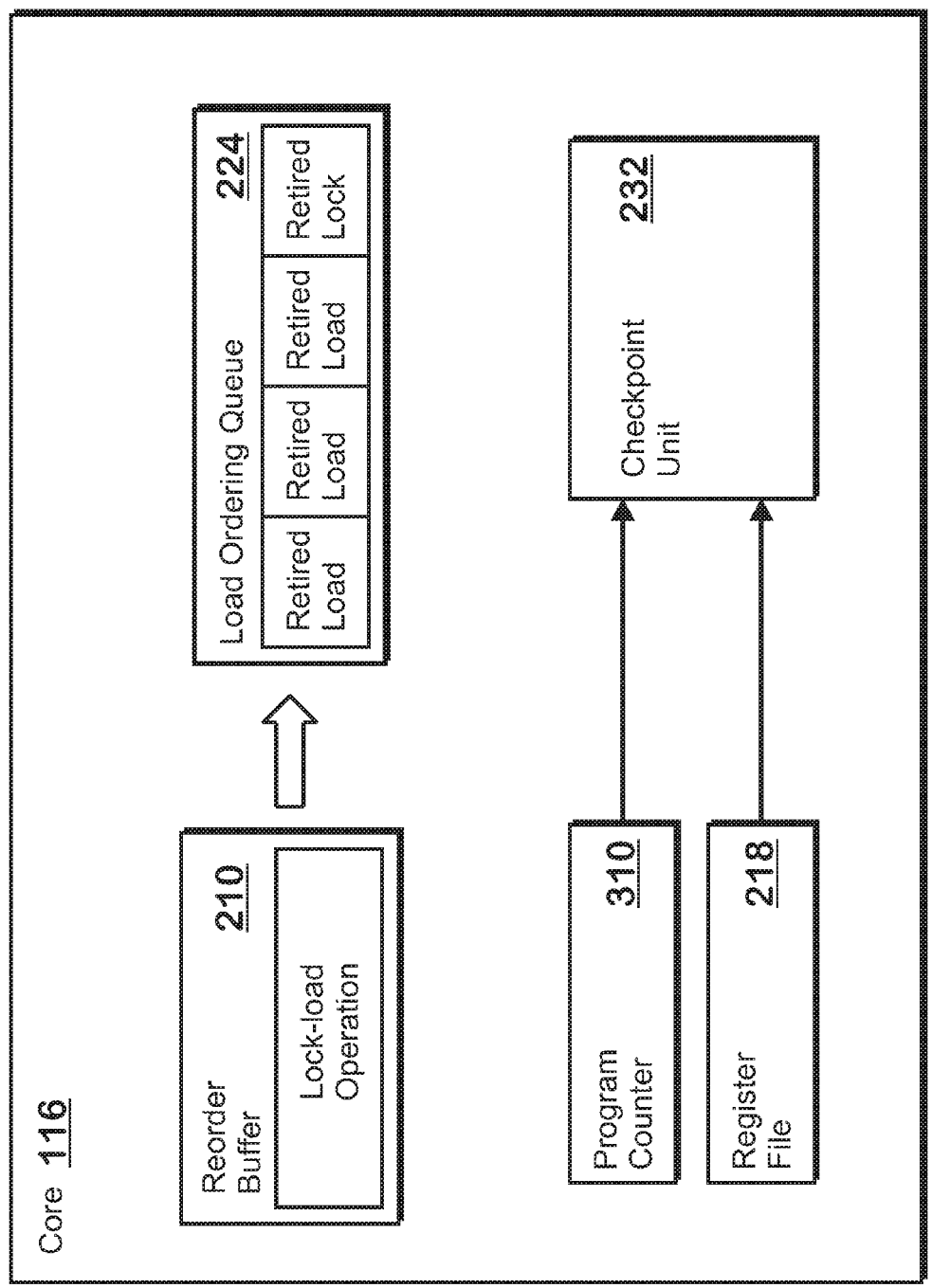
FIG. 3A is a diagram that illustrates speculative retirement of a lock instruction, according to an example.

FIG. 3A is a diagram that illustrates speculative retirement of a lock instruction, according to an example. A core 116 is shown, along with certain elements that relate to speculative retirement of a load portion of the lock instruction ("the lock-load operation"), the elements including the reorder buffer 210, a program counter 310, the register file 218, the load ordering queue 224, and the checkpoint unit 232.

The reorder buffer 210 stores instructions in program order. As described above, when an instruction is at the head of the reorder buffer 210, that instruction is the oldest instruction not yet retired. At this point, that instruction is allowed to retire. The lock instruction includes three operations: the lock-load operation, an operation that modifies the loaded data, and the lock-store operation, which stores the modified data back to the memory address specified by the lock-load operation. Although no other instruction are illustrated in FIG. 3A, the lock-load operation shown in the reorder buffer 210 is at the head of the reorder buffer 210 and is thus about to retire.

At the time at which this lock-load operation retires, the load ordering queue 224 starts to continue saving entries for load instructions that have retired. Usually, entries for load instructions that have not yet retired are maintained in the load ordering queue 224 and entries for load instructions that have retired are not maintained in the load ordering queue 224. However, entries for retired loads are maintained in the load ordering queue 224 after the lock-load operation retires and prior to the time that the lock-store operation commits, for the purposes of detecting violation of the fencing properties of the lock instruction. The lock-load operation can be tracked by the load ordering queue 224 and/or the entry within the store ordering queue 226 that corresponds to the lock-store operation.

In addition to beginning the period during which retired load instructions are maintained in the load ordering queue 224, retiring the lock-load operation also causes the checkpoint unit 232 to store a checkpoint of the state of the core 116, including contents of the register file 218 and the program counter of the lock instruction, as well as flags. Flags are small values (such as 1 bit) that indicate certain status items of the processor. Such status includes, for example, a carry flag indicating carry state of a previous addition operation; a parity flag; which indicates whether the number of bits set in a previous operation is odd or even; an adjust flag which is used for binary coded decimal arithmetic; an interrupt enable flag, which controls whether interrupts are enabled (usually used during handling of an interrupt); and other flags that control similar types of status or execution control.

Some registers are not stored in the checkpoint unit 232, such as segment registers and other infrequently updated registers. Some of such types of registers are normally updated via the commit queue 228 and other of such types of registers are updated directly. Instructions that update those registers directly cannot speculatively retire and wait for commit of the lock-store operation to complete before being retired. Instructions that update those registers via the commit queue 228 are effectively treated as store operations and are allowed to retire. Because store operations commit in program order, any store operation younger than the lock instruction cannot commit unless the lock instruction itself commits. As stated above, the store of the lock instruction commits if no violations to the atomic or fencing properties occur. Thus a store to a register that uses the store ordering queue 226 commits if the lock instruction has executed without a violation of the atomic or fencing properties. In addition to storing contents of register file 218 to the checkpoint unit 232, the core 116 also stores the value of the program counter 310 for the lock instruction in the checkpoint unit 232.

Violations occur in the event that a thread other than the thread executing the lock instruction stores to either the memory address that the lock instruction specifies (a violation of the atomic property) or to the memory address that is read by any load instruction of the same thread as the lock instruction that is younger than the lock instruction (a violation of the fencing property).

Stores from a different core 116 are detected when the core 116 executing the lock instruction receives an invalidating probe from the other core 116. An invalidating probe is a message sent between cores 116 in multi-core systems in order to ensure memory coherency. More specifically, when a particular core 116 wishes to store to a memory address, the core 116 issues an invalidating probe to other cores 116. The invalidating probe requests ownership of a particular memory address or set of memory addresses (e.g., a cache line). Cores 116 that have ownership of a memory address are allowed to write to that memory address, and cores 116 that do not have ownership of a memory address are not allowed to write to that memory address, in order to ensure coherency. Thus an invalidating probe is an indication of an intention to store to a memory address. A request to store may also be detected from a thread within the same core 116 as the core executing the lock instruction but from a thread that is different than the thread of the lock instruction. Such a request is not referred to as an invalidating probe but serves a similar purpose as an invalidating probe for the purposes of the present disclosure.

The atomic property is violated when a store to the memory address of the lock instruction from a different thread than the thread on which the lock instruction is executing is detected because of the nature of the atomic property. More specifically, the atomic property requires that between the time that the lock instruction obtains its loaded value and the time that the lock instruction stores its modified value, no other stores to the memory address associated with the lock instruction can happen. A store to such address within that time period is a violation of the atomic property.

The fencing property is violated if a store instruction from a different thread writes to the same address as that of a completed load younger than the lock instruction and in the same thread as the lock instruction (as long as the write for the store instruction occurs after the lock's load completes and before the lock's store commits its result). A violation would occur in this scenario because it would be possible for software to detect that the fencing property is violated due to a younger load consuming data from memory prematurely, where the data was later made stale by a store from another thread.

Figure 3B:
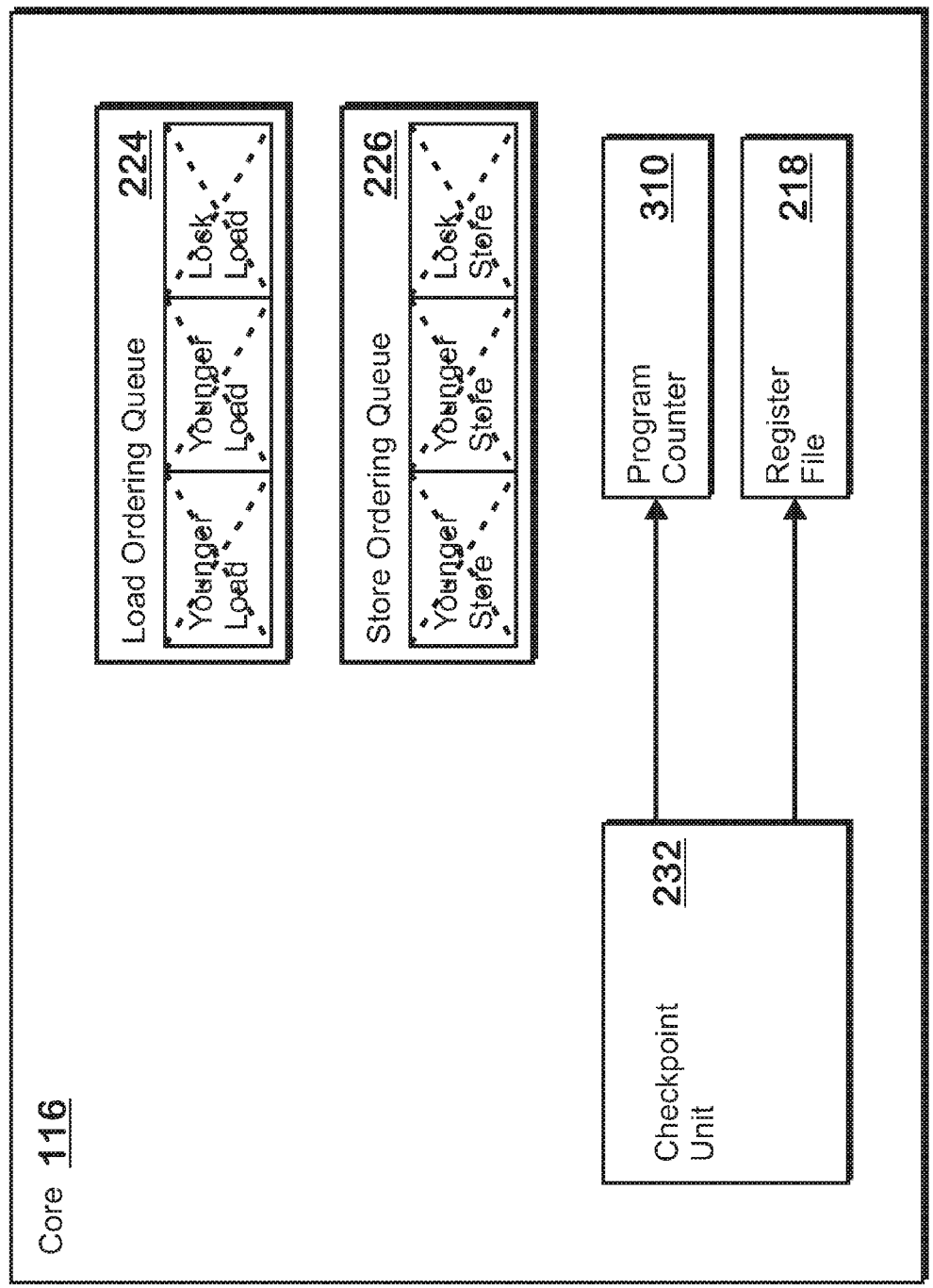
FIG. 3B is a diagram that illustrates operations that occur in response to detecting violation of the atomic or fencing property of the lock instruction, according to an example.

FIG. 3B illustrates operations that occur in response to detecting violation of the atomic or fencing property of the lock instruction, according to an example. As shown, when a violation of one of the above properties of the lock instruction occurs, the processor 102 rolls back state of the processor using checkpoint unit 232, restores the saved program counter to the program counter 310 and restarts execution at the restored program counter. Rolling back state of the processor using the checkpoint unit 232 means restoring the values of the architectural registers from the checkpoint unit 232 to the architectural registers themselves, as well as restoring the flags, and any other state stored in the checkpoint unit 232.

In addition, the core 116 also cancels all store operations younger than the lock instruction, deleting such operations from the store ordering queue 226 and the commit queue 228, and cancels load operations younger than the lock instruction, deleting those load operations from the load ordering queue 224. The core 116 then executes the lock instruction in a "slow" mode. The core 116 also removes all instructions younger than the lock instruction from the reorder buffer.

Executing the lock instruction in "slow" mode includes preventing execution of the lock instruction until all stores older than the lock instruction and from the same thread as the lock instruction have had their values committed. Instructions younger than the lock instruction are also not allowed to execute until the store portion of the lock instruction commits to memory. Additionally, the thread that is executing the lock instruction prevents any other thread from reading or writing to the memory address until the store of the lock instruction commits.

The rollback described above occurs if a violation is detected after the lock-load operation instruction has completed (i.e., when the lock-load operation has obtained its load data and sent that data to the register file) but does not occur if a violation is detected before the lock-load operation instruction has completed.

Figure 3C:
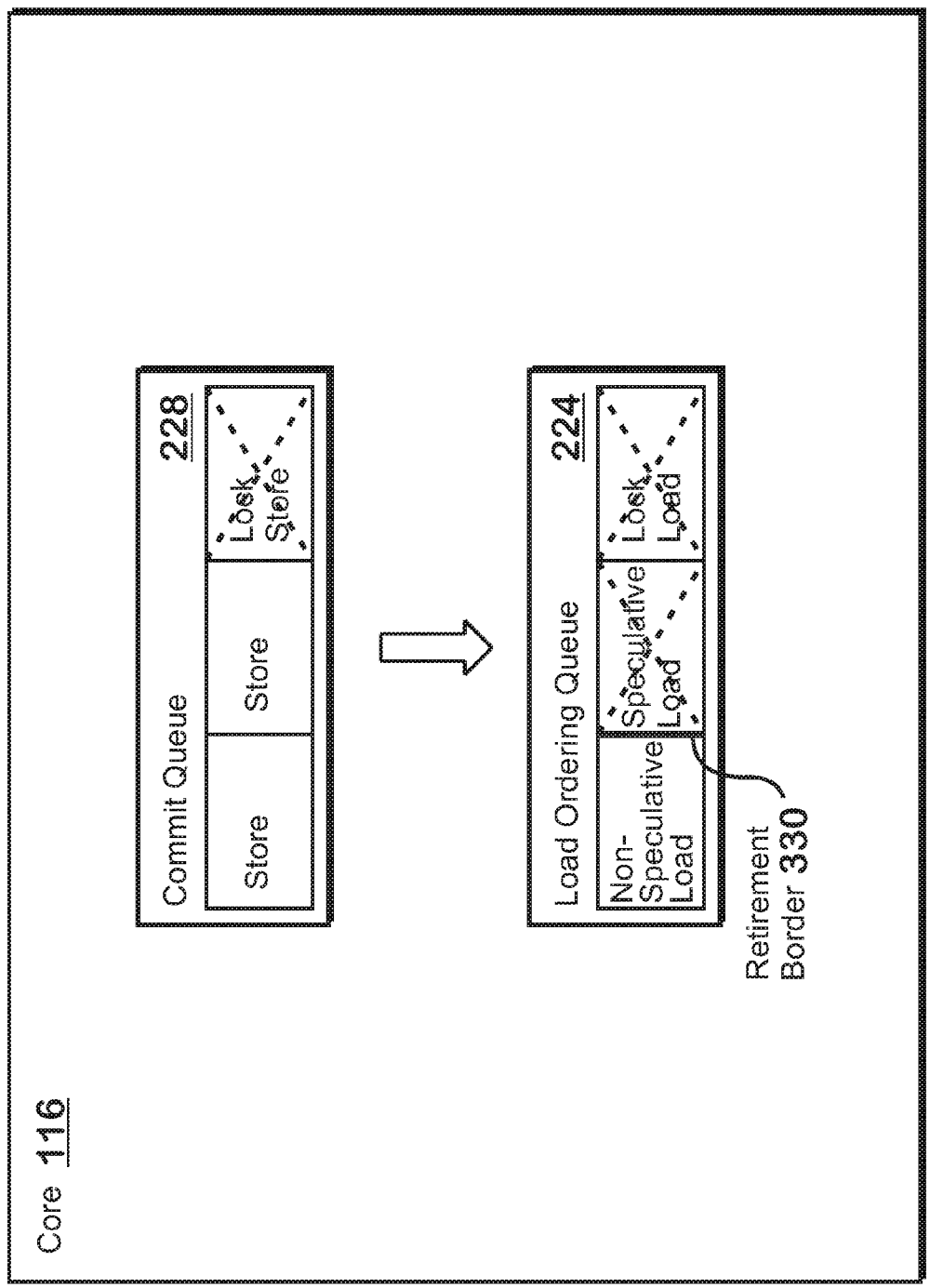
FIG. 3C is a diagram that illustrates operations that occur in the event that the atomic and fencing properties of the lock instruction are not violated before the store of the lock instruction is committed.

FIG. 3C illustrates the operations that occur in the event that the atomic and fencing properties of the lock instruction are not violated before the store of the lock instruction is committed. More specifically, once the lock-store operation commits, the lock-store operation is removed from the commit queue 228. Additionally, the load instructions that are younger than the lock instruction, as well as the load of the lock instruction itself, are no longer considered to have been retired speculatively and are removed from the load ordering queue 224. Instructions are removed from the load ordering queue in this manner until the "retirement border 330," which marks the border between instructions that have retired and instructions that have not yet retired. Instructions that have not yet retired are left in the load ordering queue 224.

Figure 4:
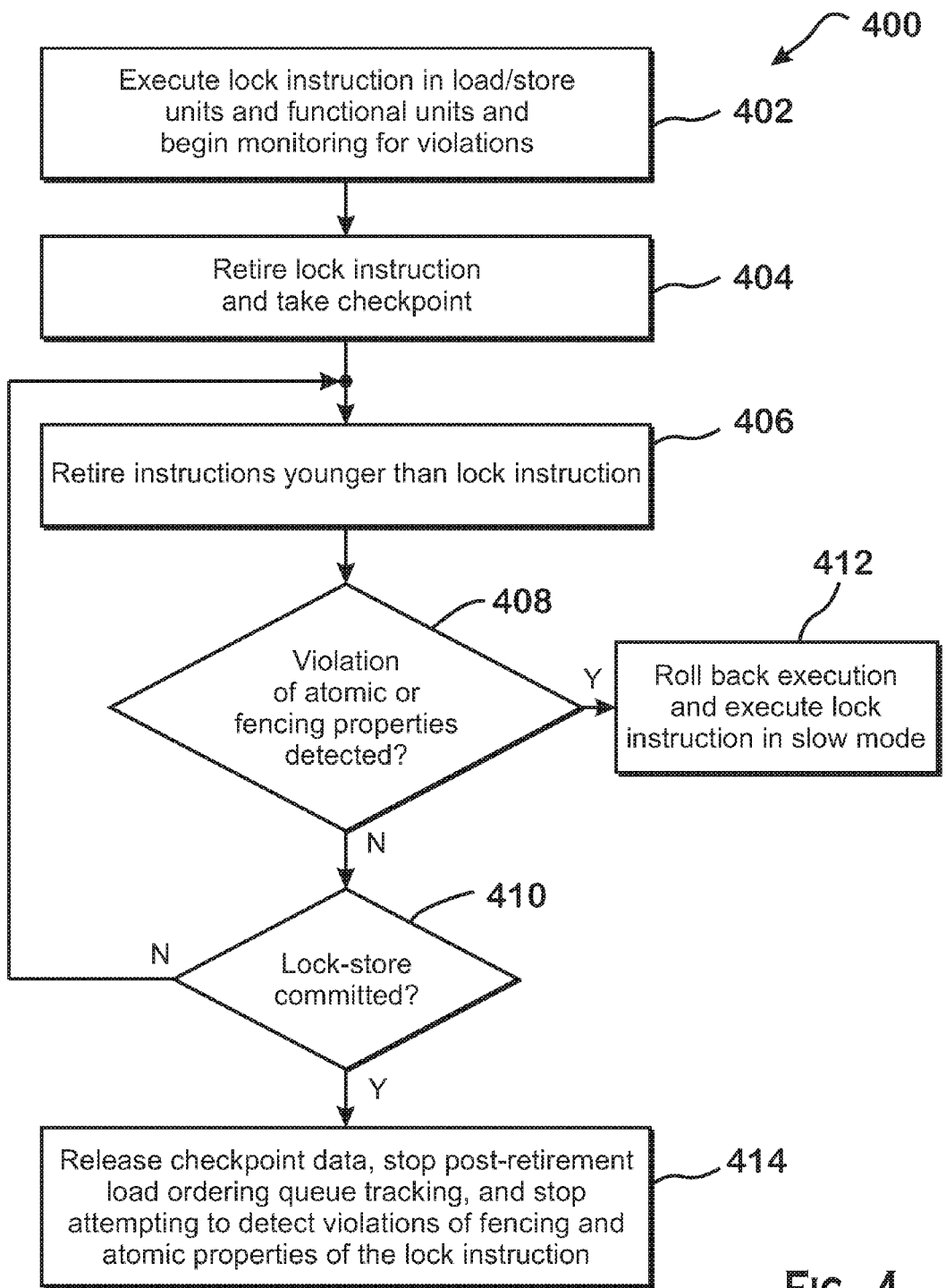
FIG. 4 is a flow diagram of a method for speculatively retiring instructions younger than a lock instruction, according to an example.

FIG. 4 is a flow diagram of a method 400 for speculatively retiring instructions younger than a lock instruction, according to an example. Although described with respect to the system shown and described in FIGS. 1-2 and 3A-3C, it should be understood that any system configured to perform the method, in any technically feasible order, falls within the scope of the present disclosure.

As shown, the method 400 begins at step 402, where an instruction execution pipeline 200 executes a lock instruction in a load/store unit 214 and in functional units 216. More specifically, the load/store unit 214 loads the value at the specified address, the functional units 216 perform the operation specified by the lock instruction, and the load/store unit 214 performs the store operation. After the load portion of the lock instruction executes, the load/store unit 214 begins monitoring for violations to the atomic and fencing properties of the lock instruction. As described above, a violation is detected by detecting a request, from another thread, to store to the memory address of the lock instruction or of a completed load instruction younger than the lock instruction.

At step 404, once the lock instruction is at the head of the reorder buffer 210, the retire unit 230 retires the lock instruction. At this point, the checkpoint unit 232 stores the checkpoint state from the pipeline 200 (including registers, flags, and other state if specified), and the load/store unit 214 begins retaining the lock instruction and younger loads from the same thread as the lock instruction in the load ordering queue 224 past retirement.

At step 406, the pipeline 200 retires instructions younger than the lock instruction. At step 408, the load/store unit 214 determines whether a violation of the atomic or fencing properties of the now-retired lock instruction has occurred. A violation occurs if a request to store to either the memory address specified by the lock instruction or by a completed load younger than the lock instruction is received from a thread other than the thread executing the lock instruction. As described above, one example of such a request is an invalidating probe, which is a message from another core that indicates a request to become "owner" of data at a particular memory address for the purpose of writing to that memory address. If a violation occurs, then the method 400 proceeds to step 412 and if a violation does not occur, then the method proceeds to step 410.

At step 412, a violation occurs. The pipeline 200 rolls back execution by replacing the program counter with the program counter of the lock instruction, by restoring the state stored in the checkpoint unit 232 to the pipeline 200, by canceling stores and loads that have executed or retired speculatively from the load ordering queue 224, store ordering queue 226, and commit queue 228, and by removing all instructions younger than the lock instruction from the reorder buffer 210. Executing the lock instruction in slow mode includes preventing execution of the lock instruction until all older stores have committed and preventing execution of instructions younger than the lock instruction until the store of the lock instruction commits.

At step 410, the load/store unit 214 determines whether the store portion of the lock instruction has committed. If the store portion has not committed, the method 400 returns to step 406 and if the store portion has committed, the method proceeds to step 414.

At step 414, because the store of the lock instruction has committed, the speculative execution period has ended. The checkpoint unit 232 releases the checkpoint data, the load order queue 224 no longer tracks post-retirement load instructions, and the load/store unit 214 stops attempting to detect violations of the atomic and fencing properties of the lock operation.

A method for speculatively retiring instructions younger than a lock instruction in a core of a processor is disclosed. The method includes retiring the lock instruction, wherein the lock instruction remains pending after retirement until a store portion of the lock instruction is deemed to be committed to memory. The method also includes saving checkpoint state of the processor responsive to retiring the lock instruction, the checkpoint state including data for rolling back state of the processor in the event of violation of an atomic property of the lock instruction or a fencing property of the lock instruction. The method further includes speculatively retiring an instruction younger than the lock instruction after retiring the lock instruction but before the store portion of the lock instruction is deemed to be committed to memory.

Detecting the violation may include detecting violation of one of the atomic property or the fencing property and responsive to detecting the violation, rolling back state of the processor via the checkpoint state. Detecting the violation may alternatively or additionally include detecting violation of the fencing property prior to the store portion of the lock instruction being deemed to be committed to memory, by detecting a request to store to a memory address associated with a load instruction younger than the lock instruction.

Rolling back state of the processor via the checkpoint state may include restoring architectural register values based on the checkpoint state, restoring a program counter of the core of the processor based on the checkpoint state, and canceling pending instructions younger than the lock instruction.

The method may also include executing the lock instruction in a slow mode, wherein in the slow mode, the lock instruction is not executed until stores older than the lock instruction have had values committed to memory, and wherein in the slow mode, instructions younger than the lock instruction are not permitted to execute until the store portion of the lock instruction is deemed to be committed to memory. The method may also include detecting no violation of the atomic property or the fencing property prior to the store portion of the lock instruction being deemed to be committed to memory, and, responsive to not detecting the violation, releasing the checkpoint state and removing post-retirement entries from a load ordering queue.

The checkpoint state may include values of architectural registers and flags of the processor. The method may also include preventing retirement of instructions that write to registers not saved by the checkpoint state prior to the store portion of the lock instruction being deemed to be committed to memory.

A processor for speculatively retiring instructions younger than a lock instruction is also disclosed. The processor includes a retire unit configured to retire the lock instruction, wherein the lock instruction remains pending after retirement until a store portion of the lock instruction is deemed to be committed to memory. The processor also includes a checkpoint unit configured to save checkpoint state of the processor responsive to the lock instruction retiring, the checkpoint state including data for rolling back state of the processor in the event of violation of an atomic property of the lock instruction or a fencing property of the lock instruction. The retire unit is also configured to speculatively retire an instruction younger than the lock instruction after retiring the lock instruction but before the store portion of the lock instruction is deemed to be committed to memory.

The processor may also include a load/store unit configured to detect violation of one of the atomic property or the fencing property, and responsive to detecting the violation, cause the processor to roll back state of the processor via the checkpoint state. The load/store unit may be configured to detect the violation by detecting violation of the atomic property prior to the store portion of the lock instruction being deemed to be committed to memory, by detecting a request to store to a memory address associated with the lock instruction.

The load/store unit may also be configured to detect the violation by detecting violation of the fencing property prior to the store portion of the lock instruction being deemed to be committed to memory, by detecting a request to store to a memory address associated with a load instruction younger than the lock instruction.

The checkpoint unit may be configured to roll back state of the processor by restoring architectural register values based on the checkpoint state, restoring a program counter of the core of the processor based on the checkpoint state, and canceling pending instructions younger than the lock instruction.

The load/store unit may be configured to cause at least one of the load/store unit and functional units of the processor to execute the lock instruction in a slow mode, wherein in the slow mode, the lock instruction is not executed until stores older than the lock instruction have had values committed to memory, and wherein in the slow mode, instructions younger than the lock instruction are not permitted to execute until the store portion of the lock instruction is deemed to be committed to memory.

The load/store unit may also be configured to, responsive to the load/store unit detecting no violation of the atomic property or the fencing property prior to the store portion of the lock instruction being deemed to be committed to memory, cause the checkpoint unit to release the checkpoint state and to remove post-retirement entries from a load ordering queue.

The checkpoint state may include values of architectural registers and flags of the processor. The retire unit may be configured to prevent retirement of instructions that write to registers not saved by the checkpoint state prior to the store portion of the lock instruction being deemed to be committed to memory.

A computer system is also included. The computer system includes a memory storing instructions for execution by a processor and a processor. The processor includes a retire unit configured to retire the lock instruction, wherein the lock instruction remains pending after retirement until a store portion of the lock instruction is deemed to be committed to memory. The processor also includes a checkpoint unit configured to save checkpoint state of the processor responsive to the lock instruction retiring, the checkpoint state including data for rolling back state of the processor in the event of violation of an atomic property of the lock instruction or a fencing property of the lock instruction. The retire unit is also configured to speculatively retire an instruction younger than the lock instruction after retiring the lock instruction but before the store portion of the lock instruction is deemed to be committed to memory.

The processor may also include a load/store unit configured to detect violation of one of the atomic property or the fencing property, and responsive to detecting the violation, cause the processor to roll back state of the processor via the checkpoint state.

The techniques described herein improve execution speed of workloads involving lock instructions. More specifically, the lock instruction itself, as well as instructions younger than the lock instruction, are allowed to retire speculatively instead of waiting for the lock instruction to fully execute. A rollback feature rolls back the state of the processor in the event that the atomic and fencing properties of the lock instruction are violated. After rollback, the lock instruction is executed in a slower, "safer" mode. Allowing the lock instruction and younger instructions to speculatively retire improves processor performance because those instructions would otherwise have to wait for the lock instruction to retire in order to retire, themselves. Allowing those instructions to retire thus improves overall instruction throughput.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements features of the above disclosure.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for speculatively retiring instructions younger than a lock instruction in a core of a processor, the method comprising:
   retiring the lock instruction, wherein the lock instruction remains pending after retirement until a store portion of the lock instruction is deemed to be committed to memory;
   saving a checkpoint state of the processor responsive to retiring the lock instruction, the checkpoint state including data for rolling back state of the processor in the event of violation of an atomic property of the lock instruction or a fencing property of the lock instruction;
   speculatively retiring an instruction younger than the lock instruction after retiring the lock instruction but before the store portion of the lock instruction is committed to memory;
   detecting violation of one of the atomic property or the fencing property of the lock instruction by detecting, from a thread other than the thread executing the lock instruction, a request to allow a store to occur to either the memory address specified by the lock instruction or to the memory address specified by a completed load instruction from the same thread as the lock instruction that is younger than the lock instruction; and
   responsive to detecting the violation, rolling back state of the processor via the checkpoint state.

2. The method of claim 1, wherein detecting the violation comprises:
   detecting violation of the atomic property prior to the store portion of the lock instruction being deemed to be committed to memory, by detecting a request to store to a memory address associated with the lock instruction.

3. The method of claim 1, wherein detecting the violation comprises:
   detecting violation of the fencing property prior to the store portion of the lock instruction being deemed to be committed to memory, by detecting a request to store to a memory address associated with a load instruction younger than the lock instruction.

4. The method of claim 1, wherein rolling back state of the processor via the checkpoint state comprises:
   restoring architectural register values based on the checkpoint state;
   restoring a program counter of the processor based on the checkpoint state; and
   canceling pending instructions younger than the lock instruction.

5. The method of claim 1, further comprising:
   executing the lock instruction in a slow mode,
   wherein in the slow mode, the lock instruction is not executed until stores older than the lock instruction have had values committed to memory, and
   wherein in the slow mode, instructions younger than the lock instruction are not permitted to execute until the store portion of the lock instruction is deemed to be committed to memory.

6. The method of claim 1, further comprising:
   retiring a second lock instruction, wherein the second lock instruction remains pending after retirement until a store portion of the second lock instruction is deemed to be committed to memory;
   saving a second checkpoint state of the processor responsive to retiring the second lock instruction, the second checkpoint state including data for rolling back state of the processor in the event of a violation of an atomic property of the second lock instruction or a fencing property of the second lock instruction;
   speculatively retiring an instruction younger than the second lock instruction after retiring the second lock instruction but before the store portion of the second lock instruction is committed to memory;
   detecting no violation of the atomic property or the fencing property prior to the store portion of the lock instruction being deemed to be committed to memory; and responsive to detecting no violation, releasing the checkpoint state and removing post-retirement entries from a load ordering queue.

7. The method of claim 1, wherein the checkpoint state includes values of architectural registers and flags of the processor.

8. The method of claim 1, further comprising:
preventing retirement of instructions that write to registers not saved by the checkpoint state prior to the store portion of the lock instruction being deemed to be committed to memory.

9. A processor for speculatively retiring instructions younger than a lock instruction, the processor comprising:
a retire unit configured to retire the lock instruction, wherein the lock instruction remains pending after retirement until a store portion of the lock instruction is committed to memory;
a checkpoint unit configured to save a checkpoint state of the processor responsive to the lock instruction retiring, the checkpoint state including data for rolling back state of the processor in the event of violation of an atomic property of the lock instruction or a fencing property of the lock instruction; and
a load/store unit,
wherein the retire unit is also configured to speculatively retire an instruction younger than the lock instruction after retiring the lock instruction but before the store portion of the lock instruction is deemed to be committed to memory, and
wherein the load/store unit is configured to:
detect violation of one of the atomic property or the fencing property of the lock instruction by detecting, from a thread other than the thread executing the lock instruction, a request to allow a store to occur to either the memory address specified by the lock instruction or to the memory address specified by a completed load instruction from the same thread as the lock instruction that is younger than the lock instruction, and
responsive to detecting the violation, roll back state of the processor via the checkpoint state.

10. The processor of claim 9, wherein the load/store unit is configured to detect the violation by:
detecting violation of the atomic property prior to the store portion of the lock instruction being deemed to be committed to memory, by detecting a request to store to a memory address associated with the lock instruction.

11. The processor of claim 9, wherein the load/store unit is configured to detect the violation by:
detecting violation of the fencing property prior to the store portion of the lock instruction being deemed to be committed to memory, by detecting a request to store to a memory address associated with a load instruction younger than the lock instruction.

12. The processor of claim 9, wherein rolling back state of the processor via the checkpoint state comprises:
restoring architectural register values based on the checkpoint state;
restoring a program counter of the processor based on the checkpoint state; and
canceling pending instructions younger than the lock instruction.

13. The processor of claim 9, wherein:
the load/store unit is configured to cause at least one of the load/store unit and functional units of the processor to execute the lock instruction in a slow mode,
wherein in the slow mode, the lock instruction is not executed until stores older than the lock instruction have had values committed to memory, and
wherein in the slow mode, instructions younger than the lock instruction are not permitted to execute until the store portion of the lock instruction is deemed to be committed to memory.

14. The processor of claim 9, wherein:
the retire unit is further configured to retire a second lock instruction,
wherein the second lock instruction remains pending after retirement until a store portion of the second lock instruction is deemed to be committed to memory;
the checkpoint unit is further configured to save a second checkpoint state of the processor responsive to retiring the second lock instruction, the second checkpoint state including data for rolling back state of the processor in the event of a violation of an atomic property of the second lock instruction or a fencing property of the second lock instruction;
the retire unit is further configured to speculatively retire an instruction younger than the second lock instruction after retiring the second lock instruction but before the store portion of the second lock instruction is committed to memory;
responsive to the load/store unit detecting no violation of the atomic property or the fencing property prior to the store portion of the lock instruction being deemed to be committed to memory, the load/store unit is configured to cause the checkpoint unit to release the checkpoint state and to remove post-retirement entries from a load ordering queue.

15. The processor of claim 9, wherein the checkpoint state includes values of architectural registers and flags of the processor.

16. The processor of claim 9, wherein the retire unit is further configured to:
prevent retirement of instructions that write to registers not saved by the checkpoint state prior to the store portion of the lock instruction being deemed to be committed to memory.

17. A computer system for speculatively retiring instructions younger than a lock instruction, the computer system comprising:
a processor; and
a memory storing instructions for execution by the processor, wherein the processor comprises:
a retire unit configured to retire the lock instruction, wherein the lock instruction remains pending after retirement until a store portion of the lock instruction is committed to memory;
a checkpoint unit configured to save a checkpoint state of the processor responsive to the lock instruction retiring, the checkpoint state including data for rolling back state of the processor in the event of violation of an atomic property of the lock instruction or a fencing property of the lock instruction; and
a load/store unit,
wherein the retire unit is also configured to speculatively retire an instruction younger than the lock instruction after retiring the lock instruction but before the store portion of the lock instruction is deemed to be committed to memory, and
wherein the load/store unit is configured to:
detect violation of one of the atomic property or the fencing property of the lock instruction by detecting, from a thread other than the thread executing the lock instruction, a request to allow a store to occur to either the memory address specified by the lock instruction or to the memory address specified by a completed load instruction from the same thread as the lock instruction that is younger than the lock instruction, and responsive to detecting the violation, roll back state of the processor via the checkpoint state.

* * * * *